US009935567B2

(12) United States Patent
Takesaki et al.

(10) Patent No.: US 9,935,567 B2
(45) Date of Patent: Apr. 3, 2018

(54) ROTATING ELECTRIC MACHINE CONTROL DEVICE

(71) Applicant: DENSO CORPORATION, Kariya, Aichi-pref. (JP)

(72) Inventors: Akira Takesaki, Kariya (JP); Nobuyori Nakajima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/195,638

(22) Filed: Jun. 28, 2016

(65) Prior Publication Data

US 2017/0005600 A1 Jan. 5, 2017

(30) Foreign Application Priority Data

Jul. 2, 2015 (JP) ................... 2015-133703

(51) Int. Cl.
| H02P 21/00 | (2016.01) |
| H02P 7/32  | (2006.01) |
| H02P 6/10  | (2006.01) |
| H02P 21/05 | (2006.01) |
| B60K 6/365 | (2007.10) |

(52) U.S. Cl.
CPC ............. H02P 6/10 (2013.01); H02P 21/05 (2013.01); B60K 6/365 (2013.01)

(58) Field of Classification Search
None
See application file for complete search history.

(56) References Cited

U.S. PATENT DOCUMENTS

| 5,038,092 A * | 8/1991 | Asano ............... H02M 7/53875 318/799 |
| 2008/0012512 A1* | 1/2008 | Kawakami ............ B60K 6/365 318/143 |
| 2016/0056745 A1 | 2/2016 | Ootake et al. |

FOREIGN PATENT DOCUMENTS

JP          H08-191600 A          7/1996

* cited by examiner

Primary Examiner — Bentsu Ro
Assistant Examiner — Zemenay Truneh
(74) Attorney, Agent, or Firm — Knobbe, Martens, Olson & Bear, LLP

(57) ABSTRACT

A rotating electric machine control device includes: a q-axis PI controller calculating a pre-restriction q-axis voltage instruction value based on a q-axis voltage detection value and a q-axis current instruction value; a first q-axis restricter calculating a post-restriction q-axis voltage instruction value by restricting the pre-restriction q-axis voltage instruction value, for an excess of output exceeding a maximum outputtable voltage V_max; a correction value calculator calculating a q-axis correction value that has a reverse phase of a ripple current of a q-axis current; and a corrector correcting the post-restriction q-axis voltage instruction value with the q-axis correction value. In such manner, even when the pre-restriction q-axis voltage instruction value is saturated, a ripple current is reduced, thereby reducing a sound and/or a vibration caused by the ripple current.

15 Claims, 11 Drawing Sheets

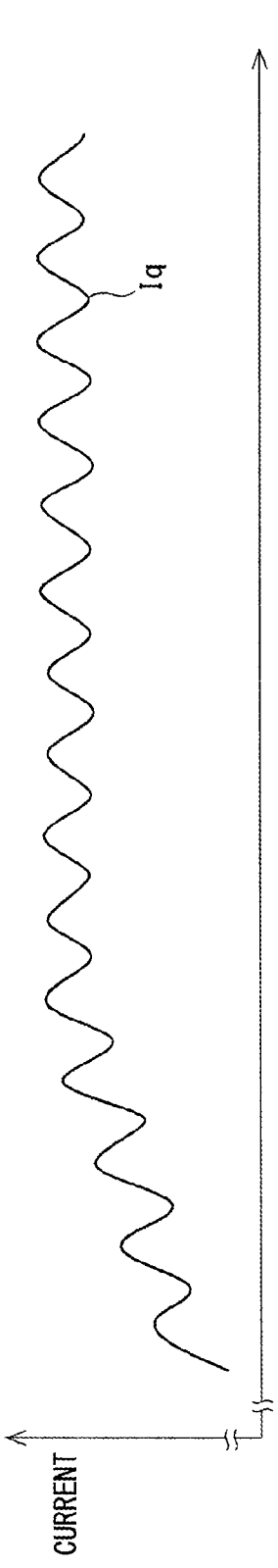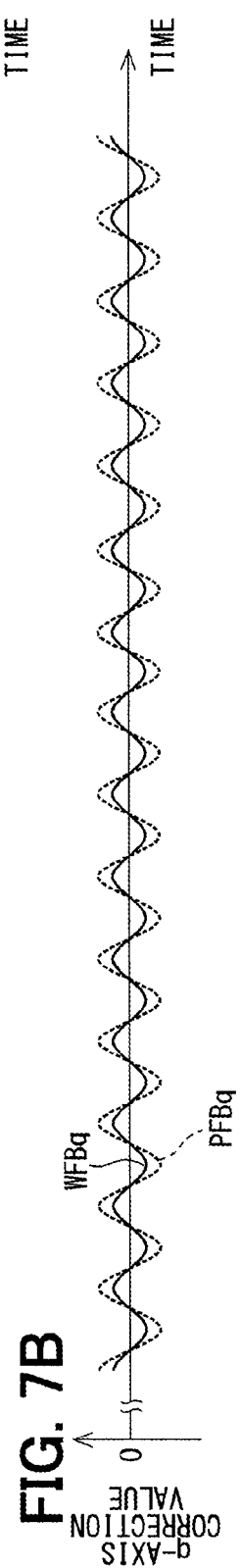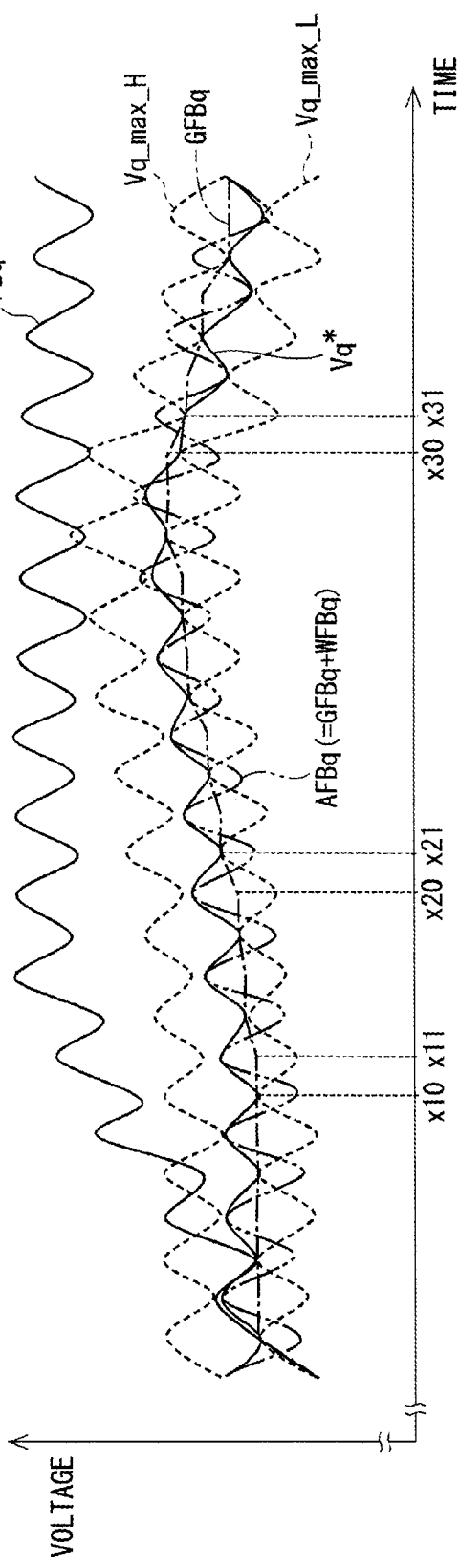

ROTATING ELECTRIC MACHINE CONTROL DEVICE

CROSS REFERENCE TO RELATED APPLICATION

The present application is based on and claims the benefit of priority of Japanese Patent Application No. 2015-133703, filed on Jul. 2, 2015, the disclosure of which is incorporated herein by reference.

TECHNICAL FIELD

The present disclosure generally relates to a rotating electric machine control device.

BACKGROUND INFORMATION

Conventionally, an electric current control device that controls an electric current supplied to an electric motor via an inverter is known.

For example, in a patent document, JP H08-191600 A (patent document 1), for avoiding a saturation of an output voltage of the inverter by controlling the d-axis/q-axis voltage instruction values, i.e., by having a constant value for the sum of squares of the d-axis voltage instruction value and the q-axis voltage instruction value, the voltage of each of the d-axis and the q-axis is restricted.

When it comes to a control of the d-axis voltage instruction value and the q-axis voltage instruction value, i.e., a control of having a constant square sum of the d-axis voltage instruction value and the q-axis voltage instruction value, as disclosed in the patent document 1, the variation of the d-axis voltage instruction value may incur the variation of the q-axis voltage instruction value, thereby causing a change of a q-axis current and also causing a noise/vibration.

SUMMARY

It is an object of the present disclosure to provide a rotating electric machine control device that is capable of preventing noise and vibration of a motor.

In an aspect of the present disclosure, a rotating electric machine control device of the present disclosure for controlling a drive of a rotating electric machine to which an application voltage is applied by an inverter, includes a pre-restriction voltage instruction value calculator, a voltage restrictor, a correction value calculator, and a corrector.

The pre-restriction voltage instruction value calculator calculates a pre-restriction voltage instruction value based on an electric current detection value and an electric current instruction value which are supplied to the rotating electric machine.

The voltage restricter restricts the pre-restriction voltage instruction value so that the maximum voltage that is outputtable from the control device is not surpassed, and calculates a post-restriction voltage instruction value.

The correction value calculator calculates a ripple correction value that has a reverse phase of a ripple current.

The corrector corrects the post-restriction voltage instruction value with the ripple correction value.

In the present disclosure, since the post-restriction voltage instruction value is corrected with the ripple correction value that has a reverse phase of the ripple current, the ripple current, or the ripple of the electric current, is reduced. Thereby, noise and vibration resulting from the ripple current are controlled and reduced.

BRIEF DESCRIPTION OF THE DRAWINGS

Objects, features, and advantages of the present disclosure will become more apparent from the following detailed description made with reference to the accompanying drawings, in which:

FIG. 7A is a time chart of a correction calculation in the first embodiment of the present disclosure;

FIG. 7B is another time chart of the correction calculation in the first embodiment of the present disclosure;

FIG. 7C is another time chart of the correction calculation in the first embodiment of the present disclosure;

DETAILED DESCRIPTION

Hereafter, a rotating electric machine control device in the present disclosure is described with reference to the drawings.

Hereafter, in the following embodiments, the same numerals are assigned to the same/similar configurations/components, and the description of the same/similar matter will not be repeated for the ease of reading.

First Embodiment

The rotating electric machine control device in the first embodiment of the present disclosure is shown in FIGS. 1-7A, 7B, 7C.

Figure 1:
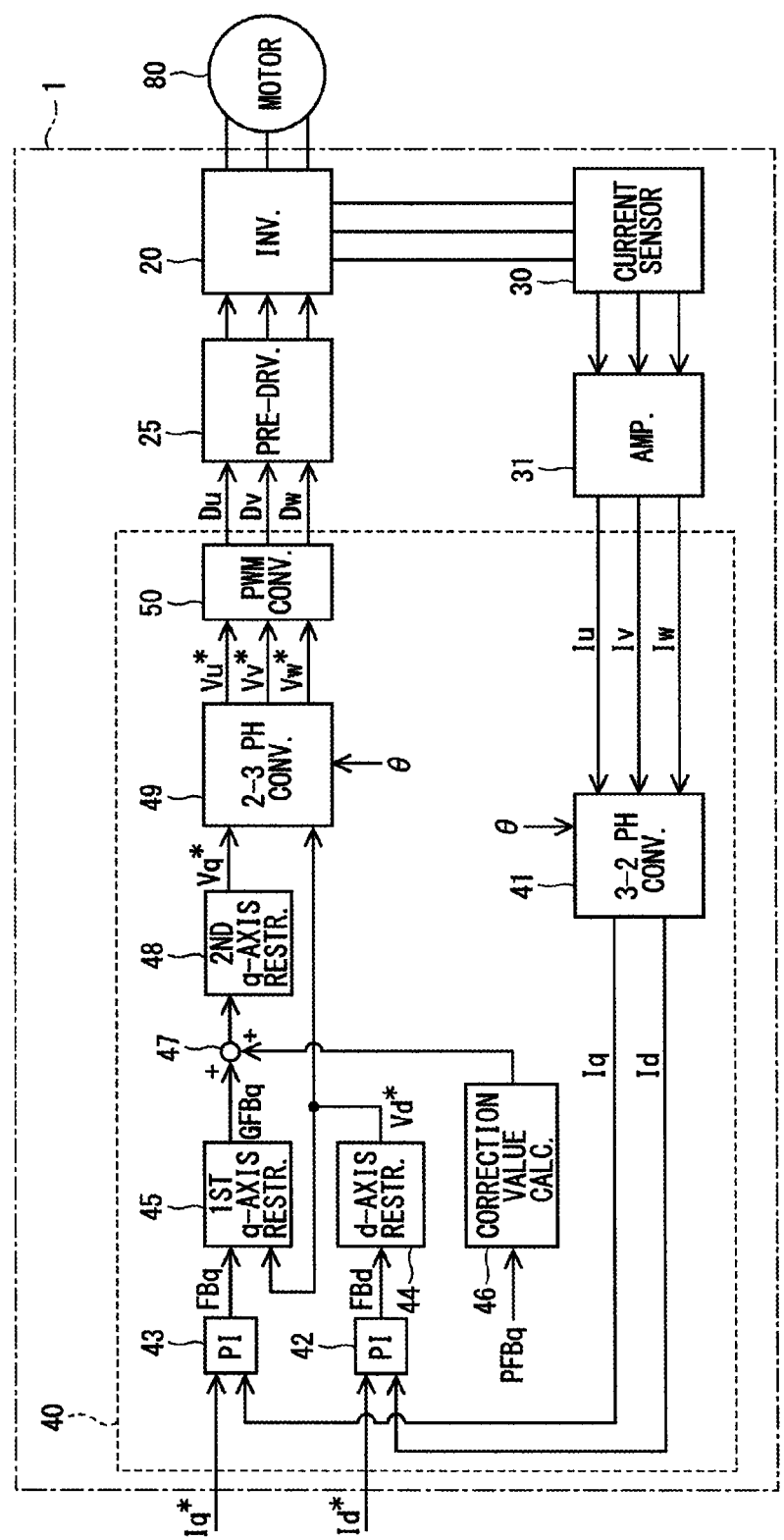
FIG. 1 is a block diagram of a rotating electric machine control device in a first embodiment of the present disclosure.

As shown in FIG. 1, a rotating electric machine control device 1 controls the drive of a motor 80 that serves as a rotating electric machine, and is applied to an electric power steering apparatus together with the motor 80, for assisting a steering operation of a vehicle, for example.

The motor 80 is a three-phase brushless motor, and is driven with an electric power from a battery that is not illustrated.

The rotating electric machine control device 1 is provided with an inverter 20, a current sensor 30, a control unit 40 and the like.

The inverter 20 is a three-phase circuit inverter, in which six switching elements are bridge-connected (not illustrated) to provide an inverter function. The switching element is, for example, a metal oxide semiconductor field effect transistor (MOSFET) which is a kind of a field effect transistor. The switching element may also not only be MOSFET, but may also be an insulated gate bipolar transistor (IGBT), a thyristor, etc. A pair of the switching elements, one on a high potential side and another on a low potential side, is provided in three sets, and a junction point of the high potential side switching element and the low potential side switching element in three pairs of the switching elements is connected to a U phase coil, to a V phase coil, or to a W phase coil of the motor 80, respectively.

Each of the switching elements in the inverter 20 is controlled via a pre-driver 25 by the control unit 40 for an ON-OFF operation, converting the direct current from the battery to the alternate current for the supply of electricity to the motor 80.

A shunt resistor or a Hall Integrated Circuit (IC) is used as the current sensor 30. The current sensor 30 detects a U phase current supplied to the U phase coil, a V phase current supplied to the V phase coil, and a W phase current supplied to the W phase coil. The detection value of the current sensor 30 is outputted to the control unit 40 via an amplifier 31.

The control unit 40 controls the rotating electric machine control device 1 as a whole, and is provided as a microcomputer together with peripheral devices for performing various calculations and processes.

Each process in the control unit 40 may be a software process by executing a program memorized in advance by a Central Processing Unit (CPU), or may be a hardware process by a dedicated electronic circuit.

The control unit 40 provides, as functional blocks, a 3-2 phase converter, PI controllers 42 and 43, a d-axis restricter 44, a first q-axis restricter 45, a correction value calculator 46, a corrector 47, and a second q-axis restricter 48, a 2-3 phase converter 49, a Pulse Width Modulation (PWM) converter 50 and the like.

The 3-2 phase converter obtains a U phase current detection value Iu, a V phase current detection value Iv, and a W phase current detection value Iw from the current sensor 30 via the amplifier 31. One of the U phase current detection value Iu, the V phase current detection value Iv, or the W phase current detected values Iw may be calculable from the detection value of the two remaining phases among the three based on a principle that a sum of three detection values=0.

The 3-2 phase converter 41 converts the U phase current detection value Iu, the V phase current detection value Iv, and the W phase current detection value Iw into a d-axis current detection value Id and a q-axis current detection value Iq by performing a dq conversion based on an electrical angle θ detected with a rotational angle sensor which is not illustrated. Thereby, the U phase current detection value Iu, the V phase current detection value Iv, and the W phase current detection value Iw are converted from three-phase circuit coordinates to d-q coordinates.

The d-axis PI controller 42 calculates a pre-restriction d-axis voltage instruction value FBd by a PI calculation or the like for controlling the d-axis current detection value Id to follow a d-axis current instruction value Id*.

The q-axis PI controller 43 calculates a pre-restriction q-axis voltage instruction value FBq by the PI calculation or the like for controlling the q-axis current detection value Iq to follow a q-axis current instruction value Iq*.

The d-axis current instruction value Id* and the q-axis current instruction value Iq* are calculated by an instruction calculator (not illustrated), for example, according to a steering torque, a vehicle speed, or the like.

The d-axis restricter 44 performs, for preventing saturation of the output voltage of the inverter 20, a d-axis restriction process in which the pre-restriction d-axis voltage instruction value FBd is restricted, and calculates a d-axis voltage instruction value Vd*.

The first q-axis restricter 45 performs, for preventing saturation of the output voltage of the inverter 20, a first q-axis restriction process in which the pre-restriction q-axis voltage instruction value FBq is restricted, and calculates a post-restriction q-axis voltage instruction value GFBq.

The details of the d-axis restriction process and the first q-axis restriction process are mentioned later.

The correction value calculator 46 calculates, for controlling a ripple of the q-axis current, a q-axis correction value WFBq.

Figure 2:
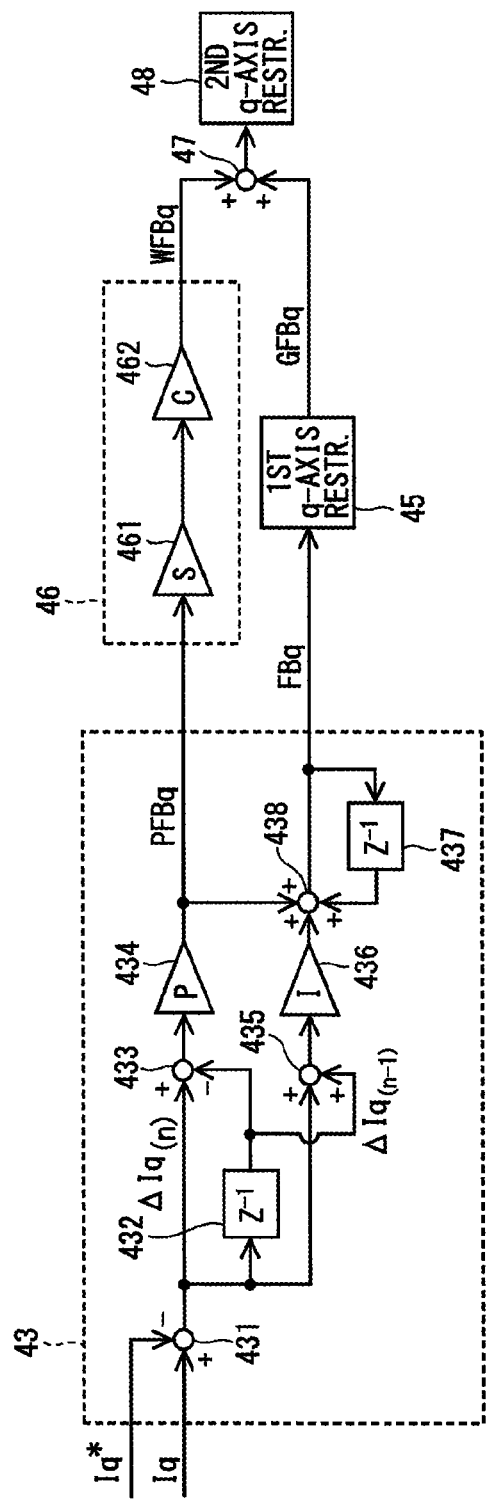
FIG. 2 is a block diagram of a q-axis PI controller and a correction value calculator in the first embodiment of the present disclosure.

Here, the details of the q-axis PI controller 43 and the correction value calculator 46 are shown in FIG. 2.

As shown in FIG. 2, the q-axis PI controller 43 has a subtracter 431, a delay element 432, a subtracter 433, a P calculator 434, an adder 435, an I calculator 436, a delay element 437, and an adder 438.

The subtracter 431 calculates a q-axis current deviation ΔIq which is a difference between the q-axis current detection value Iq and the q-axis current instruction value Iq*.

The delay element 432 outputs a previous value of the q-axis current deviation ΔIq to the subtracter 433 and to the adder 435.

Hereafter, in each of the calculations, when a previous value (i.e., a value from a previous calculation cycle) needs to be distinguished from a current value (i.e., a value from a current calculation cycle), suffixes of (n) and (n−1) are used to indicate the current value and the previous value.

The subtracter 433 calculates a deviation between a current q-axis current deviation ΔIn (n) and a previous q-axis current deviation ΔIq (n−1).

The P calculator 434 calculates a P control value PFBq based on the deviation between the current q-axis current deviation ΔIq (n) and the previous q-axis current deviation ΔIq (n−1) by using a P gain for feedback calculation.

The adder 435 calculates a sum of the current q-axis current deviation ΔIq (n) and the previous q-axis current deviation ΔIq (n−1).

The I calculator 436 calculates an I control value IFBq based on the sum of the current q-axis current deviation ΔIq (n) and the previous q-axis current deviation ΔIn (n−1) by using an I gain for feedback calculation.

The delay element 437 outputs the previous pre-restriction q-axis voltage instruction value FBq (n−1) to the adder 438.

The adder 438 adds the P control value PFBq and the I control value IFBq to the previous pre-restriction q-axis voltage instruction value FBq (n−1), and calculates the current pre-restriction q-axis voltage instruction value FBq (n).

The correction value calculator 46 has a sensitivity gain multiplier 461 and an adjustment gain multiplier 462, and calculates the q-axis correction value WFBq based on the P control value PFBq.

The sensitivity gain multiplier 461 performs a multiplication of a sensitivity gain that is used for reducing an influence of a power supply voltage on the response.

The adjustment gain multiplier 462 performs a multiplication of an adjustment gain for adjusting the response.

In the present embodiment, a value derived from a multiplication of the P control value PFBq by the sensitivity gain and the adjustment gain is used as the q-axis correction value WFBq. The gain multiplication may be only one of the sensitivity gain or the adjustment gain. Further, the correction value calculator 46 may calculate the q-axis correction value WFBq by multiplying the pre-restriction q-axis voltage instruction value FBq by the sensitivity gain and the adjustment gain, instead of multiplying the P control value PFBq.

Returning to FIG. 1, the corrector 47 performs a correction calculation which corrects the post-restriction q-axis voltage instruction value GFBq with the q-axis correction value WFBq, and calculates a post-correction q-axis voltage instruction value AFBq.

The corrector 47 of the present embodiment is an adder, i.e., adds the q-axis correction value WFBq to the post-restriction q-axis voltage instruction value GFBq, for calculating the post-correction q-axis voltage instruction value AFBq.

The second q-axis restrictor 48 performs, for preventing saturation of the output voltage of the inverter 20, a second q-axis restriction process in which the post-correction q-axis voltage instruction value AFBq is restricted, and calculates a q-axis voltage instruction value Vq*. The details of the second q-axis restriction process are mentioned later.

The 2-3 phase converter 49 converts the d-axis voltage instruction value Vd* and the q-axis voltage instruction value Vq* into a U phase voltage instruction value Vu*, a V phase voltage instruction value Vv*, and a W phase voltage instruction value Vw*, which are respectively a voltage instruction value of the three-phase circuit, by an reverse dq conversion based on the electrical angle θ.

The PWM converter 50 calculates a U phase duty Du, a V phase duty Dv and a W phase duty Dw each corresponding to the rate of an ON period of the switching element of the U/V/W phases, based on the U phase voltage instruction value Vu*, the V phase voltage instruction value Vv*, and the W phase voltage instruction value Vw*.

The U phase duty Du, the V phase duty Dv and the W phase duty Dw respectively outputted from the PWM converter 50 are converted to drive signals by the pre-driver 25. Then, based on the drive signals, the ON-OFF operation of each of the switching elements in the inverter 20 is controlled. Thereby, the control unit 40 controls the drive of the motor 80 by the PWM control by the inverter 20.

Figure 3:
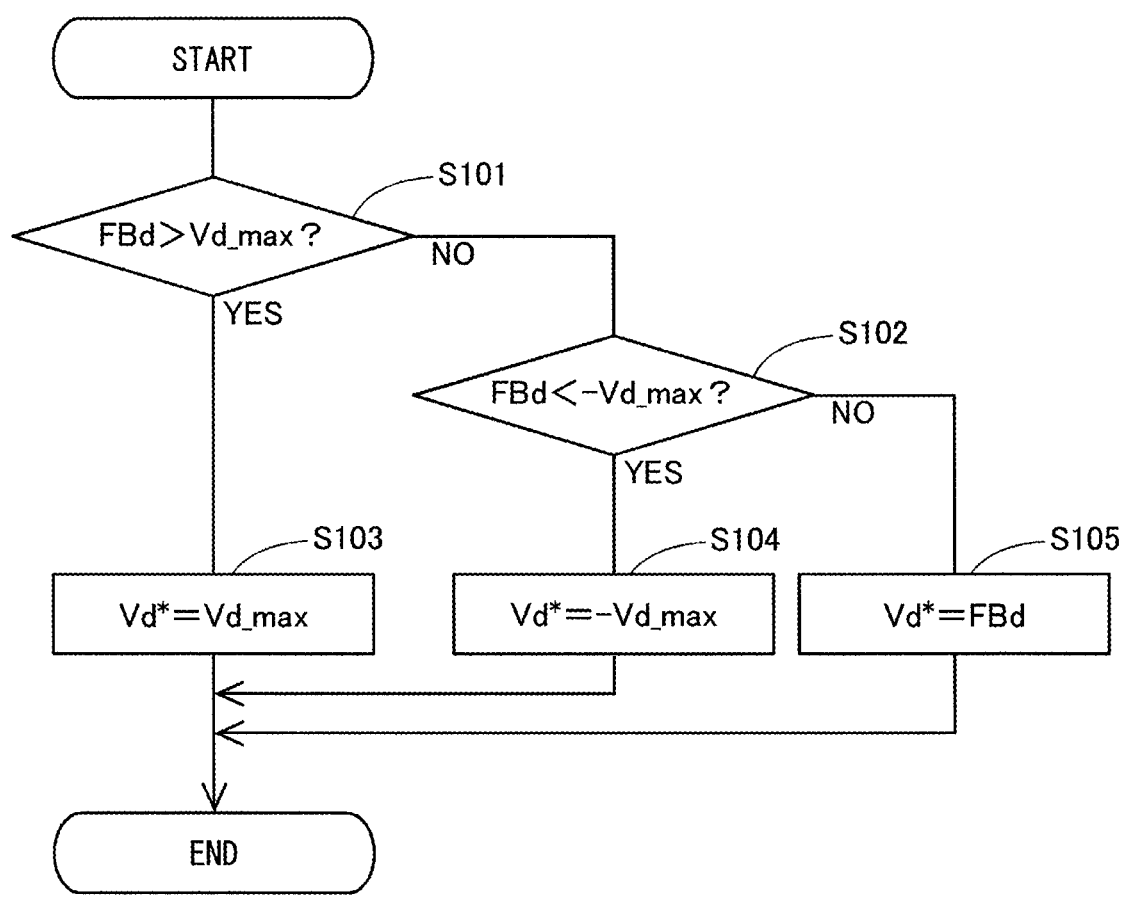
FIG. 3 is a flowchart of a d-axis restriction process in the first embodiment of the present disclosure.

The d-axis restriction process in the d-axis restricter 44 is described based on the flowchart shown in FIG. 3.

In step S101, which is a start of the process, it is determined by the d-axis restricter 44 whether the pre-restriction d-axis voltage instruction value FBd is greater than a d-axis saturation guard value Vd_max on the positive side.

Hereafter, the "step" in "step S101" etc. is omitted for a simpler representation of "In S101" or the like.

Figure 5A:
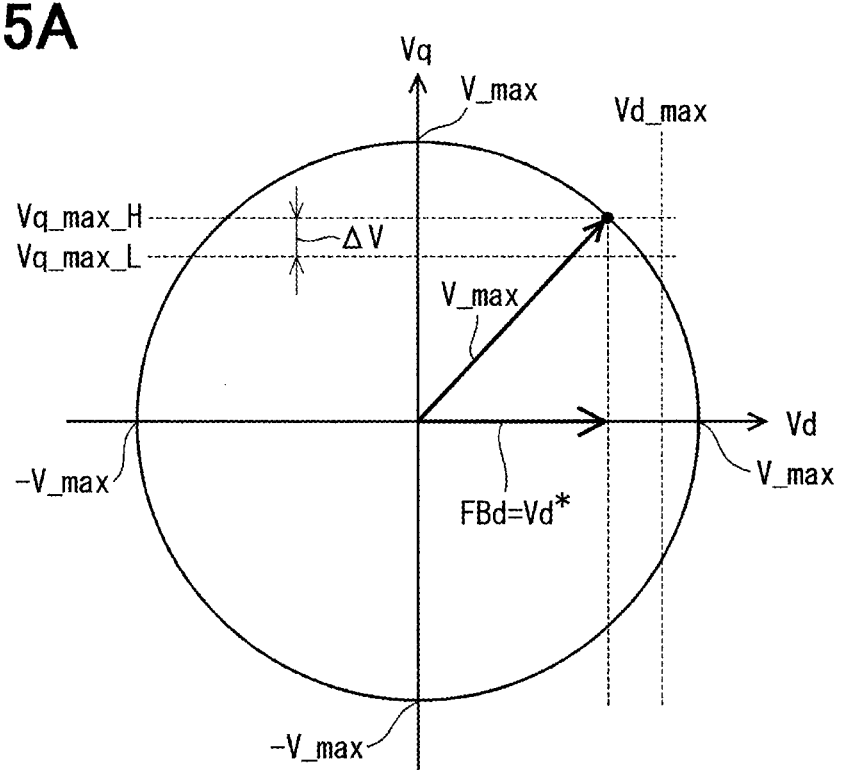
FIG. 5A is a diagram of a non-sensitive band in the first embodiment of the present disclosure.
Figure 5B:
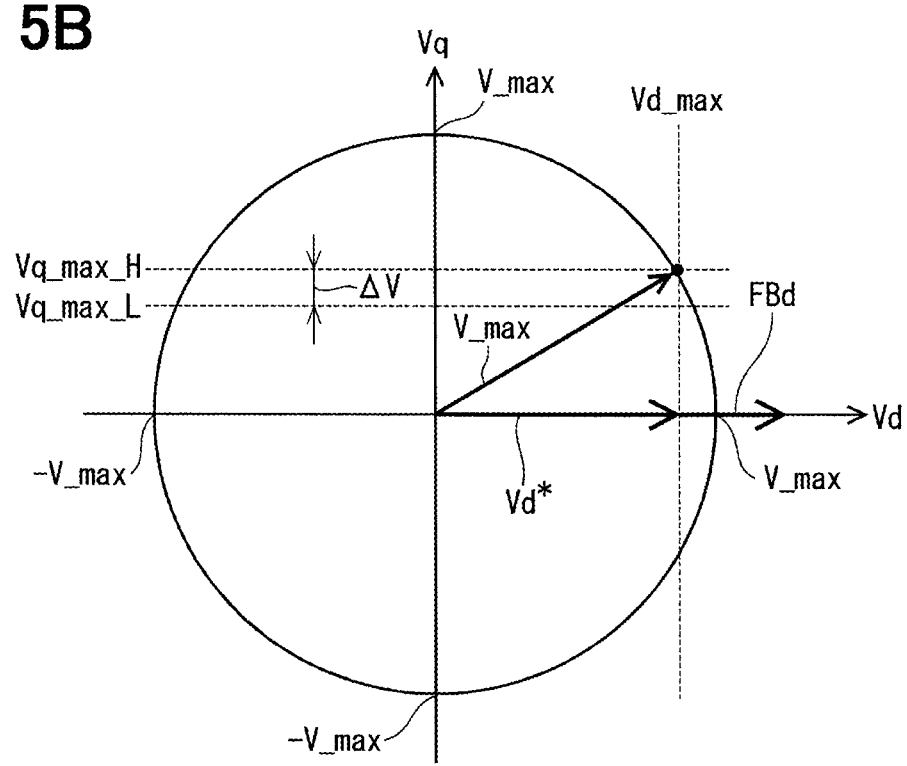
FIG. 5B is another diagram of the non-sensitive band in the first embodiment of the present disclosure.

The d-axis saturation guard value Vd_max is a constant value that is determined based on a maximum voltage V_max that prevents saturation of the output of the inverter 20 in view of an allowable advance angle (refer to FIGS. 5A, 5B).

When it is determined that the pre-restriction d-axis voltage instruction value FBd is greater than the d-axis saturation guard value Vd_max on the positive side (S101: YES), the process proceeds to S103.

When it is determined that the pre-restriction d-axis voltage instruction value FBd is equal to or less than the d-axis saturation guard value Vd_max on the positive side (S101:NO), the process proceeds to S102.

In S102, it is determined by the d-axis restricter 44 whether the pre-restriction d-axis voltage instruction value FBd is less than a d-axis saturation guard value −Vd_max on the negative side.

When it is determined that the pre-restriction d-axis voltage instruction value FBd is less than the d-axis saturation guard value −Vd_max on the negative side (S102: YES), the process proceeds to S104.

When it is determined that the pre-restriction d-axis voltage instruction value FBd is equal to or greater than the d-axis saturation guard value −Vd_max on the negative side (S102:NO), the process proceeds to S105.

In S103, which is subsequent to a determination that the pre-restriction d-axis voltage instruction value FBd is greater than the d-axis saturation guard value Vd_max on the positive side (S101:YES), the d-axis restricter 44 sets the d-axis voltage instruction value Vd* to the d-axis saturation guard value Vd_max on the positive side.

In S104, which is subsequent to a determination that the pre-restriction d-axis voltage instruction value FBd is less than the d-axis saturation guard value −Vd_max on the negative side (S102:YES), the d-axis restricter 44 sets the d-axis voltage instruction value Vd* to the d-axis saturation guard value −Vd_max on the negative side.

In S105, which is subsequent to a determination that the pre-restriction d-axis voltage instruction value FBd (i) is equal to or greater than the d-axis saturation guard value −Vd_max on the negative side, and also (ii) is equal to or less than the d-axis saturation guard value Vd_max on the positive side (S101:NO and S102:NO), the d-axis restricter 44 sets the d-axis voltage instruction value Vd* to the pre-restriction d-axis voltage instruction value FBd.

The d-axis voltage instruction value Vd* calculated by the d-axis restricter 44 is output to both of the first q-axis restricter 45 and the 2-3 phase converter 49.

Figure 4:
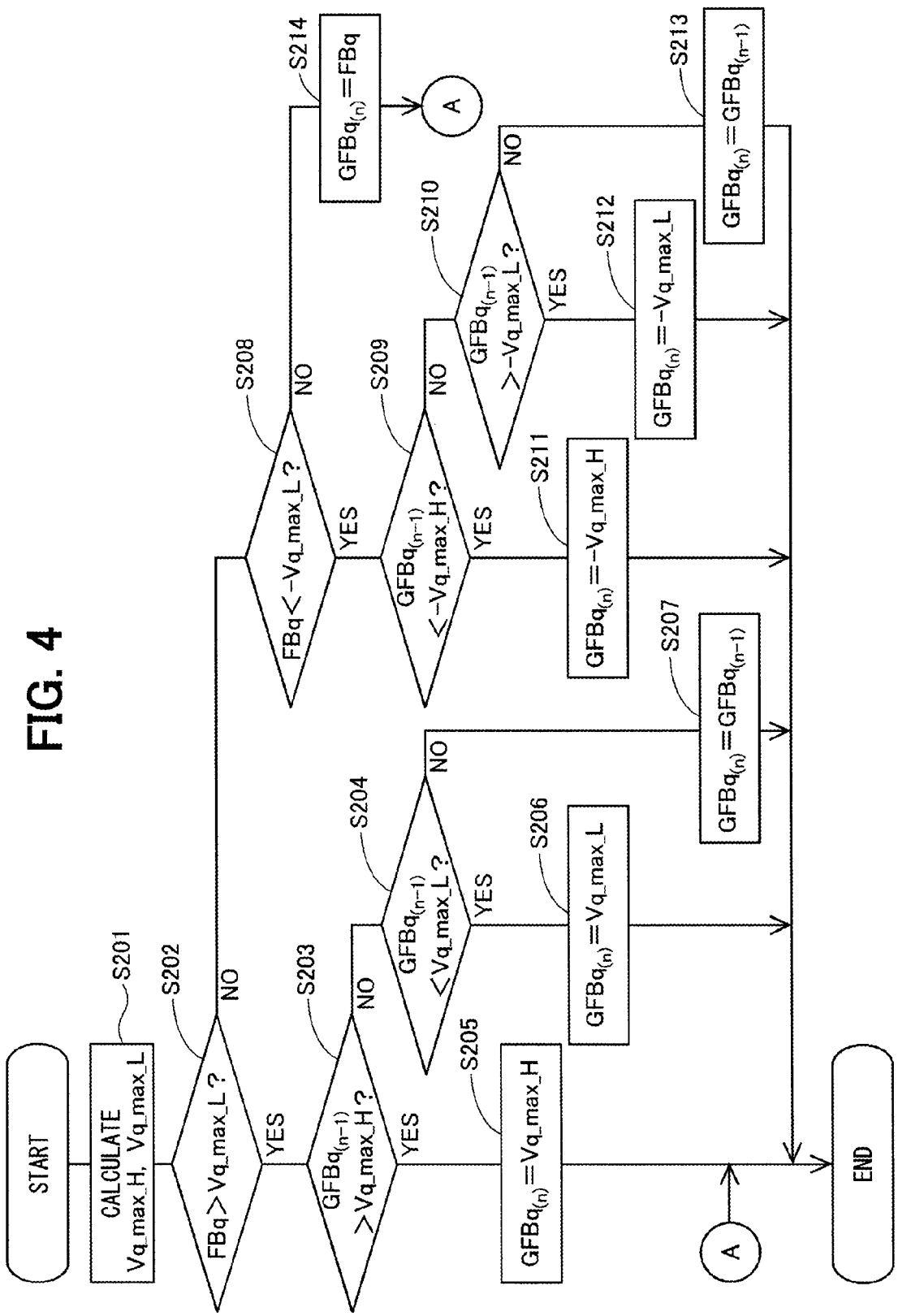
FIG. 4 is a flowchart of a first q-axis restriction process in the first embodiment of the present disclosure.

Next, the first q-axis restriction process by the first q-axis restricter 45 is described based on the flowchart shown in FIG. 4.

In S201, the first q-axis restricter 45 calculates a first q-axis saturation guard value Vq_max_H and a second q-axis saturation guard value Vq_max_L based on the d-axis voltage instruction value Vd*.

An equation 1 shows the first q-axis saturation guard value Vq_max_H and an equation 2 shows the second q-axis saturation guard value Vq_max_L. A term ΔV in those equations is a non-sensitive band width set up as an arbitrary value.

$$Vq\_max\_H = \sqrt{(V\_max)^2 - (Vd^*)^2} \quad \text{(Equation 1)}$$

$$Vq\_max\_L = Vq\_max\_H - \Delta V \quad \text{(Equation 2)}$$

The saturation guard value is described based on FIGS. 5A, 5B.

Here, as an example, both of a d-axis voltage and a q-axis voltage are positive values in assumption, and the phrase "on the positive side" is omitted.

As shown in FIG. 5A, when the pre-restriction d-axis voltage instruction value FBd is equal to or less than the d-axis saturation guard value Vd_max, the d-axis restricter 44 sets the d-axis voltage instruction value Vd* to the pre-restriction d-axis voltage instruction value FBd.

As shown in FIG. 5B, when the pre-restriction d-axis voltage instruction value FBd is greater than the d-axis saturation guard value Vd_max, the d-axis restricter 44 sets the d-axis voltage instruction value Vd* to the d-axis saturation guard value Vd_max.

The d-axis restricter 45 calculates the first q-axis saturation guard value Vq_max_H based on the maximum voltage V_max and the d-axis voltage instruction value Vd*. Further, the first q-axis restricter 45 subtracts a non-sensitive band width ΔV from the first q-axis saturation guard value Vq_max_H, and calculates the second q-axis saturation guard value Vq_max_L.

In the present embodiment, a situation in which a value of Vq exceeds the Vq_max_L is designated as "a saturation state", and an area between the second q-axis saturation guard value Vq_max_L and the first q-axis saturation guard value Vq_max_H is designated as a "saturation area".

Returning to FIG. 4, it is determined in S202 by the first q-axis restricter 45 whether the pre-restriction q-axis voltage instruction value FBq is greater than the second q-axis saturation guard value Vq_max_L on the positive side.

When it is determined that the pre-restriction q-axis voltage instruction value FBq is equal to or less than the second q-axis saturation guard value Vq_max_L on the positive side (S202:NO), the process proceeds to S208.

When it is determined that the pre-restriction q-axis voltage instruction value FBq is greater than the second q-axis saturation guard value Vq_max_L on the positive side (S202:YES), the process proceeds to S203.

The processes in S203-S207 are the restriction processes on the positive side.

In S203, it is determined by the first q-axis restricter 45 whether the previous post-restriction q-axis voltage instruction value GFBq (n−1) is greater than the first q-axis saturation guard value Vq_max_H on the positive side.

When it is determined that the previous post-restriction q-axis voltage instruction value GFBq (n−1) is greater than the first q-axis saturation guard value Vq_max_H on the positive side (S203:YES), the process proceeds to S205.

When it is determined that the previous post-restriction q-axis voltage instruction value GFBq (n−1) is equal to or less than the first q-axis saturation guard value Vq_max_H on the positive side (S203:NO), the process proceeds to S204.

In S204, it is determined by the first q-axis restricter 45 whether the previous post-restriction q-axis voltage instruction value GFBq (n−1) is less than the second q-axis saturation guard value Vq_max_L on the positive side.

When it is determined that the previous post-restriction q-axis voltage instruction value GFBq (n−1) is less than the second q-axis saturation guard value Vq_max_L on the positive side (S204:YES), the process proceeds to S206.

When it is determined that the previous post-restriction q-axis voltage instruction value GFBq (n−1) is equal to or greater than the second q-axis saturation guard value Vq_max_L on the positive side (S204:NO), the process proceeds to S207.

In S205, which is subsequent to a determination that the previous post-restriction q-axis voltage instruction value GFBq (n−1) is greater than the first q-axis saturation guard value Vq_max_H on the positive side (S203:YES), the first q-axis restricter 45 sets the current post-restriction q-axis voltage instruction value GFBq (n) to the first q-axis saturation guard value Vq_max_H on the positive side.

In S206, which is subsequent to a determination that the previous post-restriction q-axis voltage instruction value GFBq (n−1) is less than the second q-axis saturation guard value Vq_max_L on the positive side (S204:YES), the first q-axis restricter 45 sets the current post-restriction q-axis voltage instruction value GFBq (n) to the second q-axis saturation guard value Vq_max_L on the positive side.

In S207, which is subsequent to a determination that the previous post-restriction q-axis voltage instruction value GFBq (n−1) is equal to or greater than the second q-axis saturation guard value Vq_max_L on the positive side and is equal to or less than the first q-axis saturation guard value Vq_max_H on the positive side (S203:NO and S204:NO), the first q-axis restricter 45 sets the last post-restriction q-axis voltage instruction value GFBq (n) to the previous post-restriction q-axis voltage instruction value GFBq (n−1).

In S208, which is subsequent to a determination that the pre-restriction q-axis voltage instruction value FBq is equal to or less than the second q-axis saturation guard value Vq_max_L on the positive side (S202:NO), it is determined by the first q-axis restricter 45 whether the pre-restriction q-axis voltage instruction value FBq is less than the second q-axis saturation guard value −Vq_max_L on the negative side.

When it is determined that the pre-restriction q-axis voltage instruction value FBq is equal to or greater than the second q-axis saturation guard value −Vq_max_L on the negative side (S208:NO), the process proceeds to S214.

When it is determined that the pre-restriction q-axis voltage instruction value FBq is less than the second q-axis saturation guard value −Vq_max_L on the negative side (S208:YES), the process proceeds to S209.

The processes in S209-S213 are the restriction processes on the negative side.

In S209, it is determined by the first q-axis restricter 45 whether the previous post-restriction q-axis voltage instruction value GFBq (n−1) is less than the first q-axis saturation guard value −Vq_max_H on the negative side.

When it is determined that the previous post-restriction q-axis voltage instruction value GFBq (n−1) is less than the first q-axis saturation guard value −Vq_max_H on the negative side (S209:YES), the process proceeds to S211.

When it is determined that the previous post-restriction q-axis voltage instruction value GFBq (n−1) is equal to or greater than the first q-axis saturation guard value −Vq_max_H on the negative side (S209:NO), the process proceeds to S210.

In S210, it is determined by the first q-axis restricter 45 whether the previous post-restriction q-axis voltage instruction value GFBq (n−1) is greater than the second q-axis saturation guard value −Vq_max_L on the negative side.

When it is determined that the previous post-restriction q-axis voltage instruction value GFBq (n−1) is greater than the second q-axis saturation guard value −Vq_max_L on the negative side (S210:YES), the process proceeds to S212.

When it is determined that the previous post-restriction q-axis voltage instruction value GFBq (n−1) is equal to or less than the second q-axis saturation guard value −Vq_max_L on the negative side (S210:NO), the process proceeds to S213.

In S211, which is subsequent to a determination that the previous post-restriction q-axis voltage instruction value GFBq (n−1) is less than first q-axis saturation guard value −Vq_max_H on the negative side (S209:YES), the first q-axis restricter 45 sets the current post-restriction q-axis voltage instruction value GFBq (n) to the first q-axis saturation guard value −Vq_max_H on the negative side.

In S212, which is subsequent to a determination that the previous post-restriction q-axis voltage instruction value GFBq (n−1) is greater than the second q-axis saturation guard value −Vq_max_L on the negative side (S210:YES), the first q-axis restricter 45 sets the current post-restriction q-axis voltage instruction value GFBq (n) to the second q-axis saturation guard value Vq_max_L on the negative side.

In S213, which is subsequent to a determination that the previous post-restriction q-axis voltage instruction value GFBq (n−1) is equal to or greater than the first q-axis saturation guard value −Vq_max_H on the negative side and is equal to or less than the second q-axis saturation guard value −Vq_max_L on the negative side (S209:NO and S210:NO), the first q-axis restricter 45 sets the current post-restriction q-axis voltage instruction value GFBq (n) to the previous post-restriction q-axis voltage instruction value GFBq (n−1).

In S214 which is subsequent to a determination that the pre-restriction q-axis voltage instruction value FBq is equal to or greater than the second q-axis saturation guard value −Vq_max_L on the negative side and is equal to or less than the second q-axis saturation guard value Vq_max_L on the positive side (S202:NO and S208:NO), the first q-axis restricter 45 sets the current post-restriction q-axis voltage instruction value GFBq (n) to the pre-restriction q-axis voltage instruction value FBq.

Figure 6:
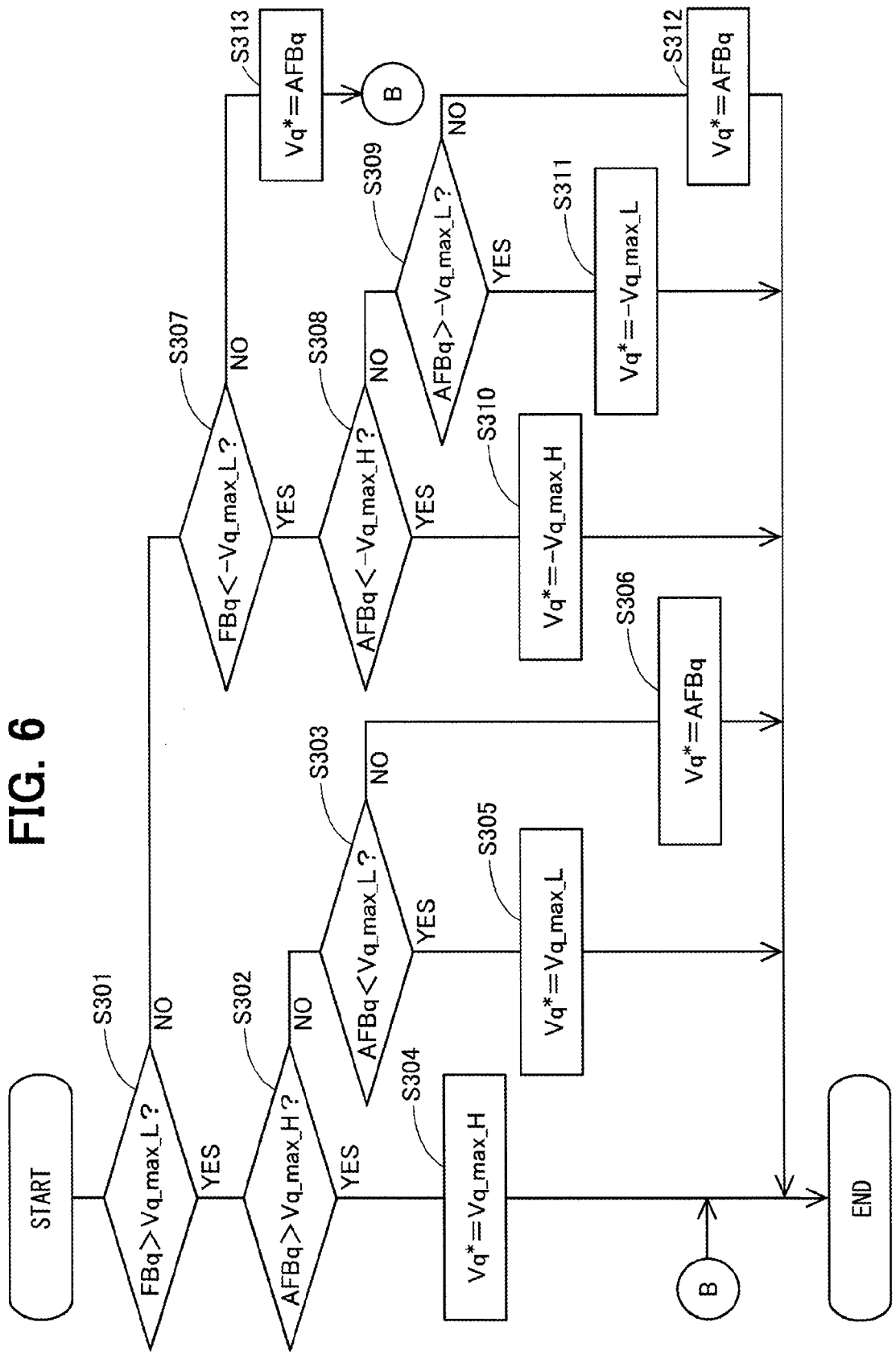
FIG. 6 is a flowchart of a second q-axis restriction process in the first embodiment of the present disclosure.

The second q-axis restriction process by the second q-axis restrictor 48 is described based on the flowchart shown in FIG. 6.

In S301, it is determined by the second q-axis restrictor 48 whether the pre-restriction q-axis voltage instruction value FBq is greater than the second q-axis saturation guard value Vq_max_L on the positive side.

When it is determined that the pre-restriction q-axis voltage instruction value FBq is equal to or less than the second q-axis saturation guard value Vq_max_L on the positive side (S301:NO), the process proceeds to S307.

When it is determined that the pre-restriction q-axis voltage instruction value FBq is greater than the second q-axis saturation guard value Vq_max_L on the positive side (S301:YES), the process proceeds to S302.

In S302, it is determined by the second q-axis restrictor 48 whether the post-correction q-axis voltage instruction value AFBq is greater than the first q-axis saturation guard value Vq_max_H on the positive side.

When it is determined that the post-correction q-axis voltage instruction value AFBq is greater than the first q-axis saturation guard value Vq_max_H on the positive side (S302:YES), the process proceeds to S304.

When it is determined that the post-correction q-axis voltage instruction value AFBq is equal to or less than the first q-axis saturation guard value Vq_max_H on the positive side (S302:NO), the process proceeds to S303.

In S303, it is determined by the second q-axis restrictor 48 whether the post-correction q-axis voltage instruction value AFBq is less than the second q-axis saturation guard value Vq_max_L on the positive side.

When it is determined that the post-correction q-axis voltage instruction value AFBq is less than the second q-axis saturation guard value Vq_max_L on the positive side (S303:YES), the process proceeds to S305.

When it is determined that the post-correction q-axis voltage instruction value AFBq is equal to or greater than the second q-axis saturation guard value Vq_max_L on the positive side (S303:NO), the process proceeds to S306.

In S304, which is subsequent to a determination that the post-correction q-axis voltage instruction value AFBq is greater than the first q-axis saturation guard value Vq_max_H on the positive side (S302:YES), the second q-axis restrictor 48 sets the q-axis voltage instruction value Vq* to the first q-axis saturation guard value Vq_max_H.

In S305, which is subsequent to a determination that the post-correction q-axis voltage instruction value AFBq is less than the second q-axis saturation guard value Vq_max_L on the positive side (S303:YES), the second q-axis restrictor 48 sets the q-axis voltage instruction value Vq* to the second q-axis saturation guard value Vq_max_L.

In S306, which is subsequent to a determination that the post-correction q-axis voltage instruction value AFBq is equal to or greater than the second q-axis saturation guard value Vq_max_L on the positive side or is equal to or less than the first q-axis saturation guard value Vq_max_H on the positive side (S302:NO and S303:NO), the second q-axis restrictor 48 sets the q-axis voltage instruction value Vq* to the post-correction q-axis voltage instruction value AFBq.

In S307, which is subsequent to a determination that the pre-restriction q-axis voltage instruction value FBq is equal to or less than the second q-axis saturation guard value Vq_max_L on the positive side (S301:NO), it is determined by the second q-axis restrictor 48 whether the pre-restriction q-axis voltage instruction value FBq is less than the second q-axis saturation guard value −Vq_max_L on the negative side.

When it is determined that the pre-restriction q-axis voltage instruction value FBq is equal to or greater than the second q-axis saturation guard value −Vq_max_L on the negative side (S307:NO), the process proceeds to S313.

When it is determined that the pre-restriction q-axis voltage instruction value FBq is less than the second q-axis saturation guard value Vq_max_L on the negative side (S307:YES), the process proceeds to S308.

In S308, it is determined by the second q-axis restrictor 48 whether the post-correction q-axis voltage instruction value AFBq is less than the first q-axis saturation guard value −Vq_max_H on the negative side.

When it is determined that the post-correction q-axis voltage instruction value AFBq is less than the first q-axis saturation guard value −Vq_max_H on the negative side (S308:YES), the process proceeds to S310.

When it is determined that the post-correction q-axis voltage instruction value AFBq is equal to or greater than the first q-axis saturation guard value −Vq_max_H on the negative side (S308:NO), the process proceeds to S309.

In S309, it is determined by the second q-axis restrictor 48 whether the post-correction q-axis voltage instruction value AFBq is greater than the second q-axis saturation guard value −Vq_max_L on the negative side.

When it is determined that the post-correction q-axis voltage instruction value AFBq is greater than the second q-axis saturation guard value −Vq_max_L on the negative side (S309:YES), the process proceeds to S311.

When it is determined that the post-correction q-axis voltage instruction value AFBq is equal to or less than the second q-axis saturation guard value −Vq_max_L on the negative side (S309:NO), the process proceeds to S312.

In S310, which is subsequent to a determination that the post-correction q-axis voltage instruction value AFBq is less than the first q-axis saturation guard value −Vq_max_H on the negative side (S308:YES), the second q-axis restrictor 48 sets the q-axis voltage instruction value Vq* to the first q-axis saturation guard value −Vq_max_H on the negative side.

In S311, which is subsequent to a determination that the post-correction q-axis voltage instruction value AFBq is greater than the second q-axis saturation guard value −Vq_max_L on the negative side (S309:YES), the second q-axis restrictor 48 sets the q-axis voltage instruction value Vq* to the second q-axis saturation guard value −Vq_max_L on the negative side.

In S312, which is subsequent to a determination that the post-correction q-axis voltage instruction value AFBq is equal to or greater than the first q-axis saturation guard value −Vq_max_H on the negative side and is equal to or less than the second q-axis saturation guard value −Vq_max_L on the negative side (S308:NO and S309:NO), the second q-axis restrictor 48 sets the q-axis voltage instruction value Vq* to the post-correction q-axis voltage instruction value AFBq.

In S313, which is subsequent to a determination that the pre-restriction q-axis voltage instruction value FBq is equal to or greater than the second q-axis saturation guard value −Vq_max_L on the negative side and is equal to or less than the second q-axis saturation guard value Vq_max_L on the positive side (S301:NO and S307:NO), the second q-axis restrictor 48 sets the q-axis voltage instruction value Vq* to the post-correction q-axis voltage instruction value AFBq.

Here, a voltage instruction calculation is described based on the time chart shown in FIGS. 7A, 7B, 7C. In FIGS. 7A, 7B, 7C, a situation in which each of the electric currents and voltages takes a positive value is described, as an example. In FIG. 7A, a graph of the q-axis current detection value Iq is shown, and in FIG. 7B, graphs of the P control value PFBq (a broken line) and the q-axis correction value WFBq are shown (a solid line). In FIG. 7C, a solid-line graph shows the pre-restriction q-axis voltage instruction value FBq and another solid-line graph shows the q-axis voltage instruction value Vq*, and a broken-line graph shows the first q-axis saturation guard value Vq_max_H and another broken line graph shows the second q-axis saturation guard value Vq_max_L, and a one-dot chain-line graph shows the post-restriction q-axis voltage instruction value GFBq, and a two-dot chain line shows a graph of the post-correction q-axis voltage instruction value AFBq.

In FIG. 7A, the graph of the q-axis current detection value Iq shows a fluctuation as time lapses (i.e., along a TIME axis), because the q-axis current detection value Iq is controlled by a feedback control, in which the fluctuating change of the electric current is caused by a feedback of the instruction value.

Here, when the q-axis voltage instruction value is restricted so that the square sum of the d-axis voltage instruction value and the q-axis voltage instruction value takes a value equal to or less than a certain threshold, for preventing saturation of the output voltage of the inverter 20, the fluctuating change of the q-axis voltage instruction value may become diffusive, due to the fluctuating change of the d-axis voltage instruction value.

Therefore, in the present embodiment, the fluctuating change of the q-axis current is controlled/restricted by providing a non-sensitive band, e.g., by establishing the non-sensitive band as an area between the first q-axis saturation guard value Vq_max_H and the second q-axis saturation guard value Vq_max_L.

More practically, as shown in FIG. 7C, i.e., defining time x10 as a previous calculation cycle and time x11 as a current calculation cycle, when the previous post-restriction q-axis voltage instruction value GFBq (n−1) is equal to or greater than the second q-axis saturation guard value Vq_max_L and is equal to or less than the first q-axis saturation guard value Vq_max_H (i.e., GFBq is between two broken lines Vq_max_H and Vq_max_L), the previous post-restriction q-axis voltage instruction value GFBq (n−1) is set to (i.e., used as) the current post-restriction q-axis voltage instruction value GFBq (n), for example.

Further, defining time x20 as a previous calculation cycle while defining time x21 as a current calculation cycle, when the previous post-restriction q-axis voltage instruction value GFBq (n−1) is less than the second q-axis saturation guard value Vq_max_L, the previous post-restriction q-axis voltage instruction value GFBq (n−1) is used as the second q-axis saturation guard value Vq_max_L, for example.

Further, defining time x30 as a previous calculation cycle while defining time x31 as a current calculation cycle, when the previous post-restriction q-axis voltage instruction value GFBq (n−1) is greater than the first q-axis saturation guard value Vq_max_H, the current post-restriction q-axis voltage instruction value GFBq (n) is used as the first q-axis saturation guard value Vq_max_H, for example.

That is, if the previous post-restriction q-axis voltage instruction value GFBq (n−1) is in the non-sensitive band, the previous value is used, i.e., inherited as the (current) post-restriction q-axis voltage instruction value GFBq. In such manner, a feedback control with the non-sensitive band is capable of more effectively reducing the noise and vibration by the restriction/control of the fluctuation of the q-axis current, than a feedback control without having the non-sensitive band, i.e., than the conventional feedback control scheme in which the saturation guard value is set to one constant value.

As shown in FIGS. 7A and 7B, the q-axis correction value WFBq calculated based on the P control value PFBq has a reverse phase to the vibration/fluctuation of the q-axis current detection value Iq. More practically, when the q-axis current detection value Iq increases, the q-axis correction value WFBq correspondingly decreases, and, when the q-axis current detection value Iq decreases, the q-axis correction value WFBq correspondingly increases.

As shown in FIG. 7C, in the present embodiment, the post-correction q-axis voltage instruction value AFBq is calculated by adding the q-axis correction value WFBq to the post-restriction q-axis voltage instruction value GFBq. In other words, the post-correction q-axis voltage instruction value AFBq is calculated by correcting the post-restriction q-axis voltage instruction value GFBq with the q-axis correction value WFBq that has a reverse phase relative to the q-axis current detection value Iq. Thereby, the ripple of the q-axis current is prevented.

Further, by performing the second q-axis restriction process on the post-correction q-axis voltage instruction value AFBq, the q-axis voltage instruction value Vq* is calculated.

The process that corrects the post-restriction q-axis voltage instruction value GFBq with the q-axis correction value WFBq may be considered as a separate and dedicated feedback control for preventing the ripple of the q-axis current, in addition to a normal feedback control. That is, by performing the ripple-prevention feedback control for preventing the ripple of the q-axis current, the voltage instruction is adaptively changed from an amount of the normal feedback control, the ripple of the q-axis current is prevented.

In the present embodiment, by defining the saturation area as the non-sensitive band, the ripple of the q-axis current is prevented by the correction of the post-restriction q-axis voltage instruction value GFBq with the ripple correction value WFBq in addition to the restriction of the fluctuation of the q-axis current caused/induced by the fluctuation of the d-axis current. In such manner, even when the pre-restriction q-axis voltage instruction value FBq is saturated, the ripple of the q-axis current is reduced or prevented, while keeping the output voltage of the inverter 20 within an outputtable range and yielding as high an output as possible.

As described in full details above, the rotating electric machine control device 1 of the present embodiment for controlling the drive of the motor 80, in which an application voltage is controllably supplied from the inverter 20, is provided with the PI controllers 42 and 43, the restrictors 44 and 45, the correction value calculator 46, and the corrector 47.

The d-axis PI controller 42 calculates the pre-restriction d-axis voltage instruction value FBd based on the d-axis current detection value Id and the d-axis current instruction value Id* which are the electric current supplied to the motor 80.

The q-axis PI controller 43 calculates the pre-restriction q-axis voltage instruction value FBq based on the q-axis current detection value Iq and the q-axis current instruction value Iq* which are the electric current supplied to the motor 80.

The d-axis restricter 44 restricts the pre-restriction d-axis voltage instruction value FBd and calculates the d-axis voltage instruction value Vd* which is the post-restriction d-axis voltage instruction value, for not exceeding the outputted maximum voltage V_max.

The first q-axis restricter 45 restricts the pre-restriction q-axis voltage instruction value FBq, and calculates the post-restriction q-axis voltage instruction value GFBq, for not exceeding the outputted maximum voltage V_max.

The correction value calculator 46 calculates the q-axis correction value WFBq having a reverse phase relative to the ripple of the q-axis current. Note that the phase of the ripple current and the phase of the ripple correction value may not only reverse phases restrictively, but may also reverse phases loosely, i.e., allowing a shift between the two phases as long as the ripple reduction effect is observed.

The corrector 47 corrects the post-restriction q-axis voltage instruction value GFBq with the q-axis correction value WFBq.

In the present embodiment, since the post-restriction q-axis voltage instruction value GFBq is corrected with the ripple correction value that has a reverse phase of the ripple current, the ripple current is reduced even when the pre-restriction q-axis voltage instruction value FBq is saturated. Thereby, the noise and vibration resulting from the ripple current is prevented or controlled.

The correction value calculator 46 calculates the q-axis correction value WFBq which corrects the post-restriction q-axis voltage instruction value GFBq based on the q-axis current detection value Iq and the q-axis current instruction value Iq*.

More practically, the correction value calculator 46 calculates the q-axis correction value WFBq based on the P control value PFBq calculated based on the q-axis current deviation ΔIq, which is a deviation between the q-axis current detection value Iq and the q-axis current instruction value Iq*.

Since the P control value PFBq is a calculation value before the first q-axis restriction process, the value PFBq depends on the amount of move of the deviation of the q-axis current, and is not under the influence of the saturation guard. Therefore, the q-axis correction value WFBq is calculated appropriately according to the ripple of the q-axis current.

Further, since the q-axis correction value WFBq is calculated by using a value that is calculated by the q-axis PI controller 43, which is a conventional feedback calculator, the calculation load for calculating the value WFBq is reduced.

In the present embodiment, two boundary values defining the boundary of the non-sensitive band is provided as the first q-axis saturation guard value Vq_max_H having a greater absolute value and as the second q-axis saturation guard value Vq_max_L having a smaller absolute value among the two values.

The first q-axis restricter 45 uses, as the current post-restriction q-axis voltage instruction value GFBq, the previous value (namely, GFBq (n−1)) when (A) the absolute value of the pre-restriction q-axis voltage instruction value FBq is greater than the absolute value of the second q-axis saturation guard value Vq_max_L and (B) the absolute value of the previous post-restriction q-axis voltage instruction value GFBq (n−1) is equal to or greater than the absolute value of the second q-axis saturation guard value Vq_max_L and is equal to or less than the absolute value of the first q-axis saturation guard value Vq_max_H.

Thereby, the torque fluctuation accompanying the fluctuation of the d-axis voltage instruction value Vd* in the first q-axis restriction process is controlled/prevented, and the noise and vibration are reduced.

The rotating electric machine control device 1 is provided with the first q-axis restricter 45 and the second q-axis restrictor 48. The second q-axis restrictor 48 restricts the post-correction q-axis voltage instruction value AFBq that is corrected by the corrector 47 so that the outputtable maximum voltage is not exceeded. Thereby, the drive of the motor 80 is appropriately controllable within a non-saturation range of the output voltage from the inverter 20.

In the present embodiment, the d-axis PI controller 42 and the q-axis PI controller 43 correspond to the "pre-restriction voltage instruction value calculator", and the d-axis restricter 44 and the first q-axis restricter 45 correspond to the "voltage restricter", and the correction value calculator 46 corresponds to the "correction value calculator", and the corrector 47 corresponds to the "corrector." Further, the first q-axis restricter 45 corresponds to the "first voltage restricter", and the second q-axis restrictor 48 corresponds to the "second voltage restricter."

The pre-restriction d-axis voltage instruction value FBd and the pre-restriction q-axis voltage instruction value FBq correspond to the "pre-restriction voltage instruction value", and the d-axis voltage instruction value Vd* and the post-restriction q-axis voltage instruction value GFBq correspond to the "post-restriction voltage instruction value", and the q-axis correction value WFBq corresponds to the "ripple correction value." Further, the first q-axis saturation guard value Vq_max_H corresponds to the "first restriction value", and the second q-axis saturation guard value Vq_max_L corresponds to the "second restriction value."

Second Embodiment

Figure 8:
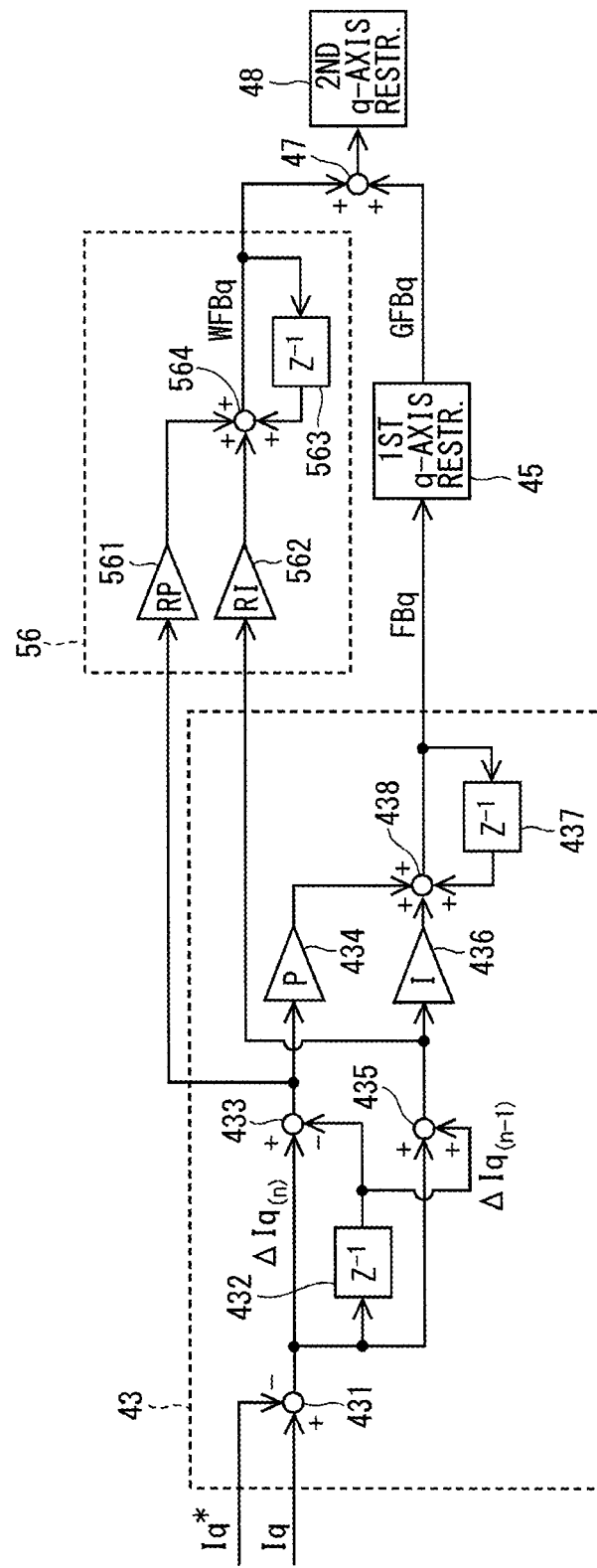
FIG. 8 is a block diagram of the correction value calculator in a second embodiment of the present disclosure.

The second embodiment of the present disclosure is described based on FIG. 8.

As shown in FIG. 8, a correction value calculator 56 in the present embodiment is different from the above-mentioned embodiment. The correction value calculator 56 has a P calculator 561 for ripple correction, an I calculator 562 for ripple correction, a delay element 563, and an adder 564.

The P calculator 561 for ripple correction calculates a P control value RPFBq for ripple correction based on the deviation between the current q-axis current deviation ΔIq (n) and the previous q-axis current deviation ΔIq (n−1) with a P gain for ripple correction.

The I calculator 562 for ripple correction calculates an I control value RIFBq for ripple correction based on the sum of the current q-axis current deviation ΔIq (n) and the previous q-axis current deviation ΔIq (n−1) with an I gain for ripple correction.

The delay element 563 outputs the previous q-axis correction value WFBq (n−1) to the adder 564. The adder 564 adds the P control value RPFBq for ripple correction and the I control value RIFBq for ripple correction to the previous q-axis correction value WFBq (n−1), and calculates the current q-axis correction value WFBq (n).

In the present embodiment, in addition to the PI calculation for calculating the pre-restriction q-axis voltage instruction value FBq, a PI calculation for ripple correction is separately performed.

The P calculator 561 for ripple correction uses a greater P gain than the one used by the P calculator 434 for an improved response, thereby enabling a reduction of the ripple current that could not be reduced by the conventional feedback control of the electric current. The same applies to the I calculator 562 for ripple correction.

Further, the I calculator 562 for ripple correction may be omitted from the correction value calculator 56, and the I calculation may be not performed.

The correction value calculator 56 of the present embodiment calculates the q-axis correction value WFBq based on the q-axis current detection value Iq and the q-axis current instruction value Iq*. More practically, the correction value calculator 56 calculates the q-axis correction value WFBq based on a deviation between the previous value and the current value of the q-axis current deviation ΔIq between the q-axis current detection value Iq and the q-axis current instruction value Iq*.

Even in such a configuration, the same effects as the above-mentioned embodiment are achieved.

In the present embodiment, the correction value calculator 56 corresponds to the "correction value calculator."

Third Embodiment

Figure 9:
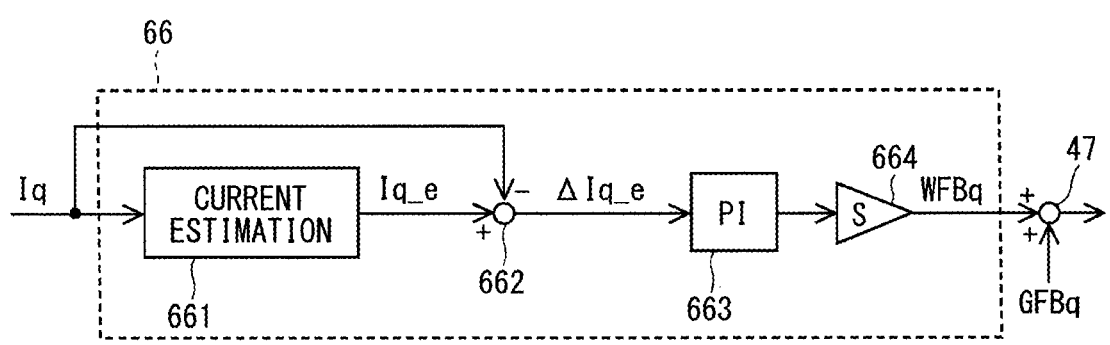
FIG. 9 is a block diagram of the correction value calculator in a third embodiment of the present disclosure.
Figure 10A:
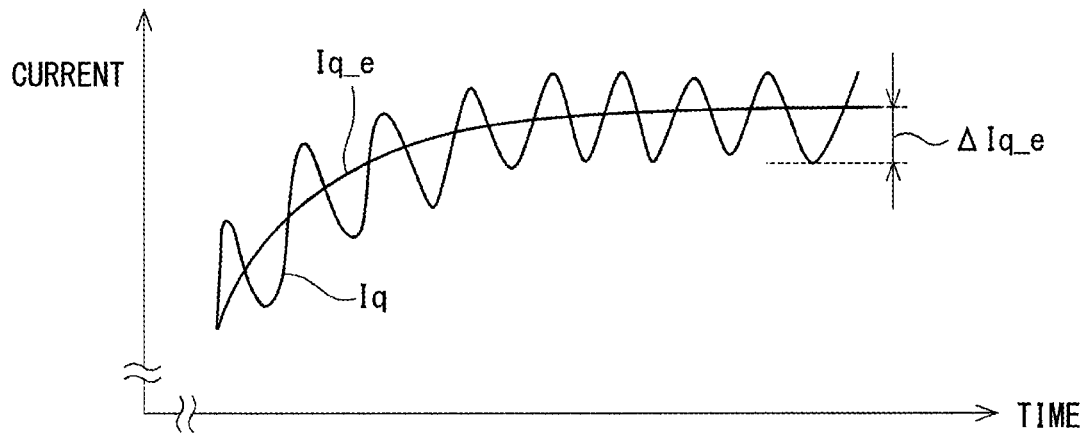
FIG. 10A is a time chart of the correction calculation in the third embodiment of the present disclosure.

The third embodiment of the present disclosure is described based on FIGS. 9 and 10A/10B/10C.

As shown in FIGS. 9 and 10A/10B/10C, a correction value calculator 66 in the present embodiment is different from the above-mentioned embodiment.

As shown in FIG. 9, the correction value calculator 66 has a current estimation unit 661, a subtracter 662, a PI controller 663, and a sensitivity gain multiplicator 664.

The current estimation unit 661 calculates a q-axis current estimation value Iq_e based on the q-axis current detection value Iq. The q-axis current estimation value Iq_e is a target value after the vibration suppression of the q-axis current. In the present embodiment, the q-axis current estimation value Iq_e is taken as a value which is derived by a low-pass filter process of the q-axis current detection value Iq. Further, the q-axis current estimation value Iq_e may be calculated as a moving average of the q-axis current detection value Iq in a preset period of time.

The subtracter 662 calculates an estimated current deviation ΔIq_e, which is a deviation between the q-axis current estimation value Iq_e and the q-axis current detection value Iq.

The PI controller 663 performs a PI calculation for the convergence of the estimated current deviation ΔIq_e to zero.

The sensitivity gain multiplicator 664 performs a multiplication of the sensitivity gain that is used for reducing an influence of a power supply voltage on the response, and calculates the q-axis correction value WFBq.

In the present embodiment, the q-axis correction value WFBq is calculated based on the estimated current deviation ΔIq_e which is derived by subtracting the q-axis current detection value Iq from the q-axis current estimation value Iq_e.

Figure 10B:
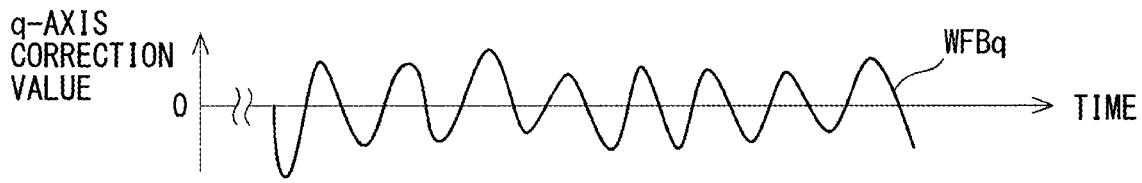
FIG. 10B is another time chart of the correction calculation in the third embodiment of the present disclosure.
Figure 10C:
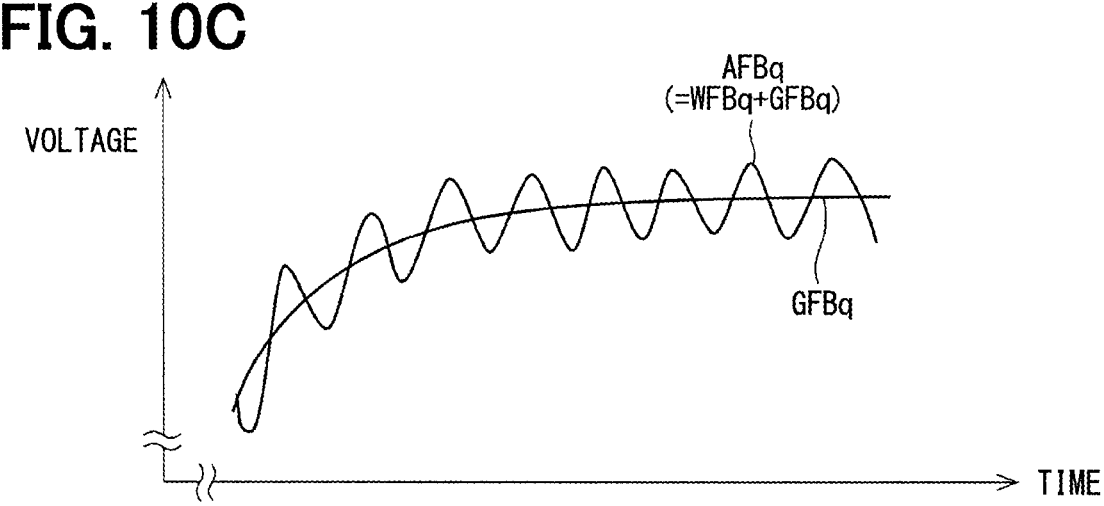
FIG. 10C is another time chart of the correction calculation in the third embodiment of the present disclosure.

Therefore, as shown in FIGS. 10A and 10B, the phase of the q-axis current detection value Iq corresponding to the q-axis current estimation value Iq_e and the phase of the q-axis correction value WFBq are respectively reversed from each other. Further, as shown in FIG. 10C, the phase of the post-correction q-axis voltage instruction value AFBq, which is derived by adding the q-axis correction value WFBq to the post-restriction q-axis voltage instruction value GFBq, and the phase of the q-axis current detection value Iq corresponding to the q-axis current estimation value Iq_e are respectively reversed from each other.

Therefore, by correcting the post-restriction q-axis voltage instruction value GFBq with the q-axis correction value WFBq that has a reverse phase relative to the q-axis current detection value Iq, the ripple of the q-axis current is reduced.

The correction value calculator 66 of the present embodiment calculates the q-axis correction value WFBq which corrects the post-restriction q-axis voltage instruction value GFBq based on (i) the q-axis current detection value Iq and (ii) the q-axis current estimation value Iq_e calculated by using the q-axis current detection value Iq. In the present embodiment, the q-axis correction value WFBq is calculated for controlling the deviation between the q-axis current estimation value Iq_e and the q-axis current detection value Iq to stay within a target range.

Even in such a configuration, the same effects as the above-mentioned embodiments are achieved.

In the present embodiment, the correction value calculator 66 corresponds to the "correction value calculator."

Fourth Embodiment

Figure 11:
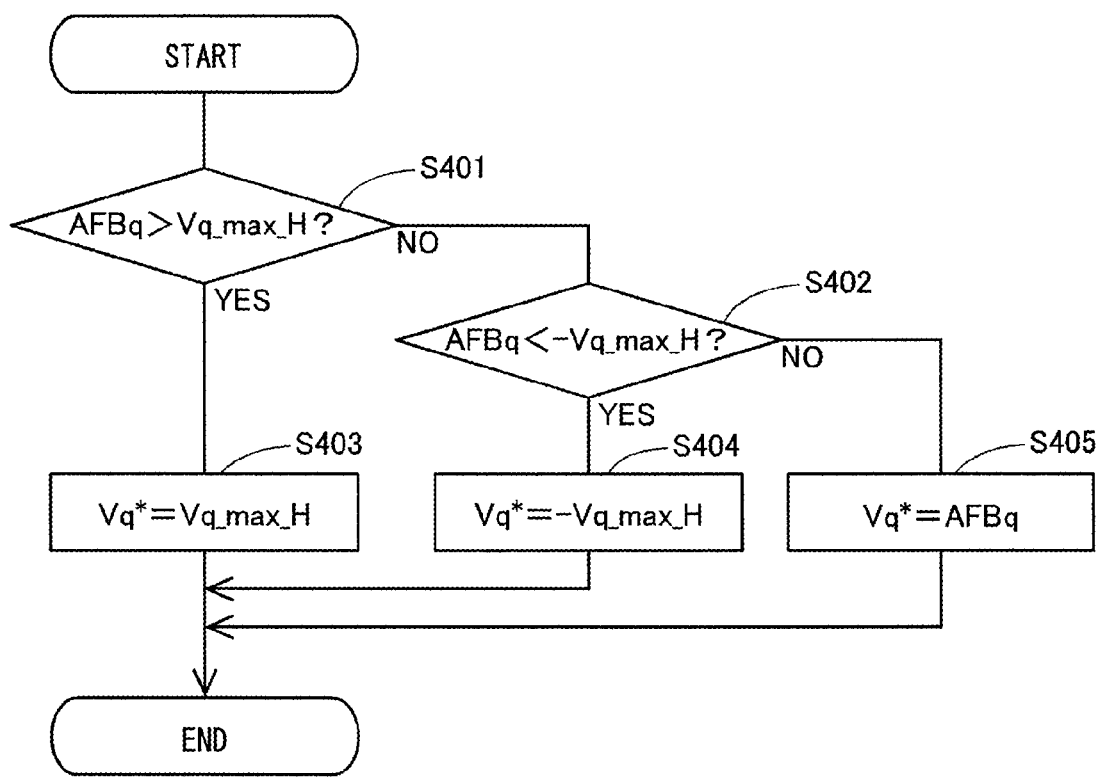
FIG. 11 is a flowchart of a second q-axis restriction process in a fourth embodiment of the present disclosure.

The fourth embodiment of the present disclosure is described based on FIG. 11.

In the present embodiment, the second q-axis restriction process is different from the above-mentioned embodiment. The calculation of the q-axis correction value WFBq may be the same as any one of the first embodiment to the third embodiment.

In S401, it is determined whether the post-correction q-axis voltage instruction value AFBq is greater than the first q-axis saturation guard value Vq_max_H on the positive side.

When it is determined that the post-correction q-axis voltage instruction value AFBq is greater than the first q-axis saturation guard value Vq_max_H on the positive side (S401:YES), the process proceeds to S403.

When it is determined that the post-correction q-axis voltage instruction value AFBq is equal to or less than the first q-axis saturation guard value Vq_max_H on the positive side (S401:NO), the process proceeds to S402.

In S402, it is determined whether the post-correction q-axis voltage instruction value AFBq is less than the first q-axis saturation guard value −Vq_max_H on the negative side.

When it is determined that the post-correction q-axis voltage instruction value AFBq is less than the first q-axis saturation guard value −Vq_max_H on the negative side (S402:YES), the process proceeds to S404.

When it is determined that the post-correction q-axis voltage instruction value AFBq is equal to or greater than the first q-axis saturation guard value −Vq_max_H on the negative side (S402:NO), the process proceeds to S405.

In S403, which is subsequent to a determination that the post-correction q-axis voltage instruction value AFBq is greater than the first q-axis saturation guard value Vq_max_H on the positive side (S401:YES), the q-axis voltage instruction value Vq* is set to the first q-axis saturation guard value Vq_max_H on the positive side.

In S404, which is subsequent to a determination that the post-correction q-axis voltage instruction value AFBq is less than the first q-axis saturation guard value −Vq_max_H on the negative side (S402:YES), the q-axis voltage instruction value Vq* is set to the first q-axis saturation guard value −Vq_max_H on the negative side.

In S405, which is subsequent to a determination that the post-correction q-axis voltage instruction value AFBq is equal to or greater than the first q-axis saturation guard value −Vq_max_H on the negative side and is equal to or less than the first q-axis saturation guard value Vq_max_H on the positive side (S401:NO and S402:NO), the q-axis voltage instruction value Vq* is set to the post-correction q-axis voltage instruction value AFBq.

In the second q-axis restriction process of the present embodiment, in one situation in which the output voltage of the inverter 20 exceeds the first q-axis saturation guard value Vq_max_H, the q-axis voltage instruction value Vq* is restricted to the first q-axis saturation guard value Vq_max_H, and, in other situations, the post-correction q-axis voltage instruction value AFBq is set to the q-axis voltage instruction value Vq*. In such manner, the ripple of the q-axis current is reduced or prevented, while keeping the output voltage of the inverter 20 within an outputtable range. Further, the calculation of the second q-axis restriction process is simplified. In addition, the same effects as the above-mentioned embodiments are also achieved.

OTHER EMBODIMENTS (a) Restriction Process

In the above-mentioned embodiments, the voltage restricter performs the restriction process based on a voltage-based value.

In different embodiments, the voltage restricter may perform the restriction process based on a "saturation rate", by calculating a saturation rate of each value against the maximum voltage. The same applies to the restriction process by the second voltage restricter.

In the above-mentioned embodiment, the non-sensitive band width is defined to have a preset value.

In different embodiments, the non-sensitive band width may be defined as a variable value according to the rotation angle speed of the motor. For example, by decreasing the non-sensitive band width in the high speed rotation time of the motor than the one in the low speed rotation time, the output power of the motor is prioritized than the reduction of the sound and vibration.

In different embodiments, the non-sensitive band width may be defined as a variable value according to the d-axis voltage instruction value. For example, by increasing the non-sensitive band width when the absolute value of the d-axis voltage instruction value takes a greater value, the noise and vibration is reduced at a time when the d-axis voltage instruction value takes a near-maximum voltage value.

Further, by decreasing the non-sensitive band width when the absolute value of the d-axis voltage instruction value takes a smaller value, the fall/decline of the output of the motor is prevented at a time when the d-axis current value takes a near-zero value.

In different embodiments, the non-sensitive band width may be defined as a variable value according to a value other than the rotation angle speed of the motor or the d-axis voltage instruction value. Further, the non-sensitive band width in the first q-axis restriction process and the non-sensitive band width in the second q-axis restriction process may be respectively different values.

In different embodiments, the first q-axis restriction process may have no non-sensitive band width, and the restriction process may be performed based on one/constant saturation guard value. Further, the second q-axis restriction process may be omitted.

(c) Corrector

In the above-mentioned embodiments, the adder, which adds the q-axis correction value to the pre-restriction q-axis current instruction value, corresponds to the corrector.

In different embodiments, the corrector may be a calculator (i.e., an operator) other than the adder, and the calculation of the correction for correcting the post-restriction voltage instruction value with the ripple correction value may be provided as an operation other than the addition.

In the above-mentioned embodiments, the correction value calculator calculates the ripple correction value of the q-axis, and the corrector corrects the post-restriction q-axis voltage instruction value of the q-axis.

In different embodiments, the calculation of the ripple correction value and the correction of the post-restriction voltage instruction value may be performed for correcting a different-axis ripple current other than the q-axis.

In the first embodiment and the second embodiment, the ripple correction value is calculated by the P calculation (or PI calculation) based on the current detection value and the current instruction value, and, in the third embodiment, the ripple correction value is calculated by using the current estimation value.

In different embodiments, the post-restriction voltage instruction value may be corrected by both of (i) the ripple correction value calculated by the P calculation (or PI calculation) based on the current detection value and the current instruction value and (ii) the ripple correction value calculated by using the current estimation value.

(d) Rotating Electric Machine

In the above-mentioned embodiments, the rotating electric machine is the three-phase brushless motor. In different embodiments, the motor may be any kind, other than the three-phase brushless motor.

In the above-mentioned embodiments, the rotating electric machine is the motor (i.e., an electric motor). In different embodiments, the rotating electric machine may be a motor-generator, which may serve as both of the motor and the generator.

In the above-mentioned embodiments, the rotating electric machine control device is applied to the electric power steering apparatus.

In different embodiments, the rotating electric machine control device may be applied to any device other than the electric power steering apparatus.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A rotating electric machine control device for controlling a drive of a rotating electric machine in which an application voltage is supplied from an inverter to the rotating electric machine, the rotating electric machine control device comprising:
   a pre-restriction voltage instruction value calculator calculating a pre-restriction voltage instruction value based on an electric current detection value and an electric current instruction value regarding an electric current supplied to the rotating electric machine;
   a voltage restrictor (i) restricting the pre-restriction voltage instruction value to stay under a maximum outputtable voltage and (ii) calculating a post-restriction voltage instruction value;
   a correction value calculator calculating a ripple correction value that has a reverse phase to a ripple current; and
   a corrector correcting the post-restriction voltage instruction value by the ripple correction value, wherein
   restriction of the pre-restriction voltage instruction value by the voltage restrictor has a non-sensitive band that is defined by a first restriction value and a second restriction value, with an absolute value of the first restriction value being greater than an absolute value of the second restriction value, and wherein
   the voltage restrictor uses the post-restriction voltage instruction value in a previous cycle of a current cycle of restriction of the pre-restriction voltage instruction value when (A) an absolute value of the pre-restriction voltage instruction value is greater than an absolute value of the second restriction value, and (B) an absolute value of the previous-cycle post-restriction voltage instruction value (B-1) is equal to or greater than an absolute value of the second restriction value and (B-2) is equal to or less than an absolute value of the first restriction value.

2. The rotating electric machine control device of claim 1, wherein
   the correction value calculator calculates the ripple correction value based on the electric current detection value and the electric current instruction value.

3. The rotating electric machine control device of claim 1, wherein
   the correction value calculator calculates the ripple correction value based on an electric current estimation value that is calculated by using the electric current detection value and the electric current instruction value.

4. The rotating electric machine control device of claim 1, wherein
   the voltage restrictor serves as a first voltage restrictor, and
   a secondary restriction is provided by a second voltage restrictor that is configured for restricting the post-restriction voltage instruction value that has been corrected by the corrector.

5. The rotating electric machine control device of claim 1 further comprising:
   an additional voltage restrictor restricting the post-restriction voltage instruction value that has been corrected by the corrector.

6. A rotating electric machine control device for controlling a drive of a rotating electric machine in which an application voltage is supplied from an inverter to the rotating electric machine, the rotating electric machine control device comprising:
   a pre-restriction voltage instruction value calculator calculating a pre-restriction voltage instruction value based on an electric current detection value and an electric current instruction value regarding an electric current supplied to the rotating electric machine;
   a voltage restrictor (i) restricting the pre-restriction voltage instruction value to stay under a maximum outputtable voltage and (ii) calculating a post-restriction voltage instruction value;
   a correction value calculator calculating a ripple correction value that has a reverse phase to a ripple current; and
   a corrector correcting the post-restriction voltage instruction value by the ripple correction value, wherein
   the voltage restrictor serves as a first voltage restrictor, and wherein
   a secondary restriction is provided by a second voltage restrictor that is configured for restricting the post-restriction voltage instruction value that has been corrected by the corrector.

7. The rotating electric machine control device of claim 6, wherein
   the correction value calculator calculates the ripple correction value based on the electric current detection value and the electric current instruction value.

8. The rotating electric machine control device of claim 6, wherein
   the correction value calculator calculates the ripple correction value based on an electric current estimation value that is calculated by using the electric current detection value and the electric current instruction value.

9. The rotating electric machine control device of claim 6, wherein
   restriction of the pre-restriction voltage instruction value by the voltage restrictor has a non-sensitive band that is defined by a first restriction value and a second restriction value, with an absolute value of the first restriction value being greater than an absolute value of the second restriction value, and wherein
   the voltage restrictor uses the post-restriction voltage instruction value in a previous cycle of a current cycle of restriction of the pre-restriction voltage instruction value when (A) an absolute value of the pre-restriction voltage instruction value is greater than an absolute value of the second restriction value, and (B) an absolute value of the previous-cycle post-restriction voltage instruction value (B-1) is equal to or greater than an absolute value of the second restriction value and (B-2) is equal to or less than an absolute value of the first restriction value.

10. The rotating electric machine control device of claim 6 further comprising:
    an additional voltage restrictor restricting the post-restriction voltage instruction value that has been corrected by the corrector.

11. A rotating electric machine control device for controlling a drive of a rotating electric machine in which an application voltage is supplied from an inverter to the rotating electric machine, the rotating electric machine control device comprising:
- a pre-restriction voltage instruction value calculator calculating a pre-restriction voltage instruction value based on an electric current detection value and an electric current instruction value regarding an electric current supplied to the rotating electric machine;
- a voltage restrictor (i) restricting the pre-restriction voltage instruction value to stay under a maximum outputtable voltage and (ii) calculating a post-restriction voltage instruction value;
- a correction value calculator calculating a ripple correction value that has a reverse phase to a ripple current;
- a corrector correcting the post-restriction voltage instruction value by the ripple correction value; and
- an additional voltage restrictor restricting the post-restriction voltage instruction value that has been corrected by the corrector.

12. The rotating electric machine control device of claim 11, wherein
the correction value calculator calculates the ripple correction value based on the electric current detection value and the electric current instruction value.

13. The rotating electric machine control device of claim 11, wherein
the correction value calculator calculates the ripple correction value based on an electric current estimation value that is calculated by using the electric current detection value and the electric current instruction value.

14. The rotating electric machine control device of claim 11, wherein
restriction of the pre-restriction voltage instruction value by the voltage restrictor has a non-sensitive band that is defined by a first restriction value and a second restriction value, with an absolute value of the first restriction value being greater than an absolute value of the second restriction value, and wherein
the voltage restrictor uses the post-restriction voltage instruction value in a previous cycle of a current cycle of restriction of the pre-restriction voltage instruction value when (A) an absolute value of the pre-restriction voltage instruction value is greater than an absolute value of the second restriction value, and (B) an absolute value of the previous-cycle post-restriction voltage instruction value (B-1) is equal to or greater than an absolute value of the second restriction value and (B-2) is equal to or less than an absolute value of the first restriction value.

15. The rotating electric machine control device of claim 11, wherein
the voltage restrictor serves as a first voltage restrictor, and wherein
a secondary restriction is provided by a second voltage restrictor that is configured for restricting the post-restriction voltage instruction value that has been corrected by the corrector.

* * * * *